United States Patent
Moorhouse et al.

(10) Patent No.: US 10,466,686 B2
(45) Date of Patent: Nov. 5, 2019

(54) SYSTEM AND METHOD FOR AUTOMATIC CONFIGURATION OF A DATA COLLECTION SYSTEM AND SCHEDULE FOR CONTROL SYSTEM MONITORING

(71) Applicant: Honeywell International Inc., Morris Plains, NJ (US)

(72) Inventors: James Edward Moorhouse, Milford, OH (US); Andrew Duca, Phoenix, AZ (US); Seth G. Carpenter, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 283 days.

(21) Appl. No.: 15/436,130

(22) Filed: Feb. 17, 2017

(65) Prior Publication Data
US 2018/0239341 A1     Aug. 23, 2018

(51) Int. Cl.
*G05B 19/418* (2006.01)
*G05B 17/02* (2006.01)

(52) U.S. Cl.
CPC ... *G05B 19/41865* (2013.01); *G05B 19/4183* (2013.01); *G05B 17/02* (2013.01); *G05B 2219/25419* (2013.01); *G05B 2219/31284* (2013.01); *Y02P 90/02* (2015.11); *Y02P 90/18* (2015.11); *Y02P 90/20* (2015.11)

(58) Field of Classification Search
CPC .. G05B 13/048; G05B 17/02; G05B 19/4183; G05B 19/41865; G05B 2219/25419; G05B 2219/31284; G06F 16/2471; G06F 17/212; G06Q 10/0637; G06Q 10/06; H04L 41/0213; H04L 41/046; H04L 41/12; H04L 41/5009; H04L 45/02; H04L 67/10;
(Continued)

(56) References Cited

U.S. PATENT DOCUMENTS 6,941,557 B1   9/2005   Jakobson et al.
7,539,724 B1   5/2009   Callaghan
(Continued)

FOREIGN PATENT DOCUMENTS

JP    2013038601      2/2013
KR    1020030021537   3/2003
(Continued)

OTHER PUBLICATIONS

International Search Report and Written Opinion of the International Searching Authority for International Application No. PCT/US2018/018195 dated May 17, 2018, 11 pages.
(Continued)

*Primary Examiner* — Le H Luu (57) ABSTRACT

A method includes discovering one or more assets associated with a system. The method also includes determining first data that could be collected from each of the one or more assets by cross-referencing the one or more assets with a collection model. The method further includes determining second data that is to be collected from each of the one or more assets by cross-referencing the first data with requirements of one or more applications that use data from the one or more assets. In addition, the method includes automatically generating a schedule for collection of the second data from the one or more assets.

19 Claims, 5 Drawing Sheets

(58) Field of Classification Search
CPC ........... H04W 4/00; Y02P 90/02; Y02P 90/18; Y02P 90/20
See application file for complete search history.

(56) References Cited

U.S. PATENT DOCUMENTS

| | | |
|---|---|---|
| 2003/0200304 A1 | 10/2003 | Thorpe et al. |
| 2004/0128374 A1 | 7/2004 | Hodges et al. |
| 2006/0092861 A1* | 5/2006 | Corday ............... H04L 41/0213 370/256 |
| 2007/0297557 A1 | 12/2007 | Kuwatani |
| 2008/0228908 A1* | 9/2008 | Link .................... H04L 41/046 709/223 |
| 2010/0046395 A1* | 2/2010 | Sivaramakrishna Iyer ................. H04L 41/12 370/254 |
| 2010/0082133 A1 | 4/2010 | Chouinard et al. |
| 2010/0106528 A1 | 4/2010 | Brackett et al. |
| 2011/0040399 A1 | 2/2011 | Lu |
| 2011/0252005 A1* | 10/2011 | Lauer ................. G06F 16/2471 707/690 |
| 2011/0270966 A1* | 11/2011 | Zhou ................... H04L 41/0213 709/224 |
| 2011/0276165 A1 | 11/2011 | Ko et al. |
| 2012/0029678 A1 | 2/2012 | McGreevy et al. |
| 2012/0079282 A1 | 3/2012 | Lowenstein et al. |
| 2013/0212186 A1 | 8/2013 | Camp et al. |
| 2014/0047107 A1 | 2/2014 | Maturana et al. |
| 2014/0074558 A1* | 3/2014 | Jain .................... G06Q 10/0637 705/7.36 |
| 2014/0121789 A1 | 5/2014 | Brandes et al. |
| 2014/0337277 A1* | 11/2014 | Asenjo ................. G06Q 10/06 707/603 |
| 2014/0344369 A1 | 11/2014 | Goldberg et al. |
| 2014/0362807 A1* | 12/2014 | Bhatnagar ............... H04W 4/00 370/329 |
| 2015/0007265 A1 | 1/2015 | Aissi et al. |
| 2015/0077263 A1 | 3/2015 | Ali et al. |
| 2016/0109495 A1* | 4/2016 | Sterkel ................. G06F 17/212 702/62 |
| 2016/0248624 A1* | 8/2016 | Tapia .................. H04L 41/5009 |
| 2016/0294670 A1* | 10/2016 | Pacella .................. H04L 45/02 |
| 2016/0349726 A1 | 12/2016 | Srinivasan et al. |
| 2017/0104639 A1* | 4/2017 | Jiang ....................... H04L 67/10 |
| 2017/0364043 A1* | 12/2017 | Ganti ................... G05B 13/048 |

FOREIGN PATENT DOCUMENTS

| | | |
|---|---|---|
| KR | 101077591 B1 | 10/2011 |
| KR | 1020120087235 | 8/2012 |
| KR | 1020130006760 | 1/2013 |
| KR | 1020140059788 | 5/2014 |
| KR | 1020140103859 | 8/2014 |

OTHER PUBLICATIONS

Notification of Transmittal of the International Search Report and the Written Opinion of the International Searching Authority dated Jul. 28, 2016 in connection with International Patent Application No. PCT/US2016/029953, 10 pages.

Notification of Transmittal of the International Search Report and the Written Opinion of the International Searching Authority dated Aug. 9, 2016 in connection with International Patent Application No. PCT/US2016/029758, 11 pages.

Notification of Transmittal of the International Search Report and the Written Opinion of the International Searching Authority dated Jul. 28, 2016 in connection with International Patent Application No. PCT/US2016/030012, 12 pages.

International Search Report and the Written Opinion of the International Searching Authority dated Jul. 28, 2016 in connection with International Patent Application No. PCT/US2016/030037, 8 pages.

Notification of Transmittal of the International Search Report and the Written Opinion of the International Searching Authority, or the Declaration dated Aug. 9, 2016 in connection with International Patent Application No. PCT/US2016/030377, 11 pages.

Notification of Transmittal of the International Search Report and the Written Opinion of the International Searching Authority, or the Declaration dated Jul. 28, 2016 in connection with International Patent Application No. PCT/US2016/029984, 13 pages.

Matthew G. Burd, et al., "Apparatus and Method for Universal Annotation in Industrial Process Control and Automation System", U.S. Appl. No. 14/869,857, 44 pages.

* cited by examiner

SYSTEM AND METHOD FOR AUTOMATIC CONFIGURATION OF A DATA COLLECTION SYSTEM AND SCHEDULE FOR CONTROL SYSTEM MONITORING

TECHNICAL FIELD

This disclosure relates generally to industrial process control and automation systems. More specifically, this disclosure relates to a system and method for automatic configuration of a data collection system and schedule for control system monitoring.

BACKGROUND

Large-scale systems, such as industrial process control and automation systems, often include hundreds or thousands of system assets like computers, sensors, actuators, and controllers. In order to ensure that such large systems are performing optimally, it is beneficial to regularly monitor the health and performance of system assets, such as by using a health and performance monitoring system. When installing a new monitoring system, several weeks of effort may be required to fully configure the system for data collection. For example, such systems can require considerable time by site experts to identify the assets to be monitored and to configure the collection schedule for these assets. This results in non-competitive costs and long delays in returned value.

SUMMARY

This disclosure provides a system and method for automatic configuration of a data collection system and schedule for control system monitoring.

In a first embodiment, a method includes discovering one or more assets associated with a system. The method also includes determining first data that could be collected from each of the one or more assets by cross-referencing the one or more assets with a collection model. The method further includes determining second data that is to be collected from each of the one or more assets by cross-referencing the first data with requirements of one or more applications that use data from the one or more assets. In addition, the method includes automatically generating a schedule for collection of the second data from the one or more assets.

In a second embodiment, an apparatus includes at least one processing device. The at least one processing device is configured to discover one or more assets associated with a system. The at least one processing device is also configured to determine first data that could be collected from each of the one or more assets by cross-referencing the one or more assets with a collection model. The at least one processing device is further configured to determine second data that is to be collected from each of the one or more assets by cross-referencing the first data with requirements of one or more applications that use data from the one or more assets. In addition, the at least one processing device is configured to automatically generate a schedule for collection of the second data from the one or more assets.

In a third embodiment, a non-transitory computer readable medium contains instructions that, when executed by at least one processing device, cause the at least one processing device to discover one or more assets associated with a system. The medium also contains instructions that, when executed by the at least one processing device, cause the at least one processing device to determine first data that could be collected from each of the one or more assets by cross-referencing the one or more assets with a collection model. The medium further contains instructions that, when executed by the at least one processing device, cause the at least one processing device to determine second data that is to be collected from each of the one or more assets by cross-referencing the first data with requirements of one or more applications that use data from the one or more assets. In addition, the medium contains instructions that, when executed by the at least one processing device, cause the at least one processing device to automatically generate a schedule for collection of the second data from the one or more assets.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
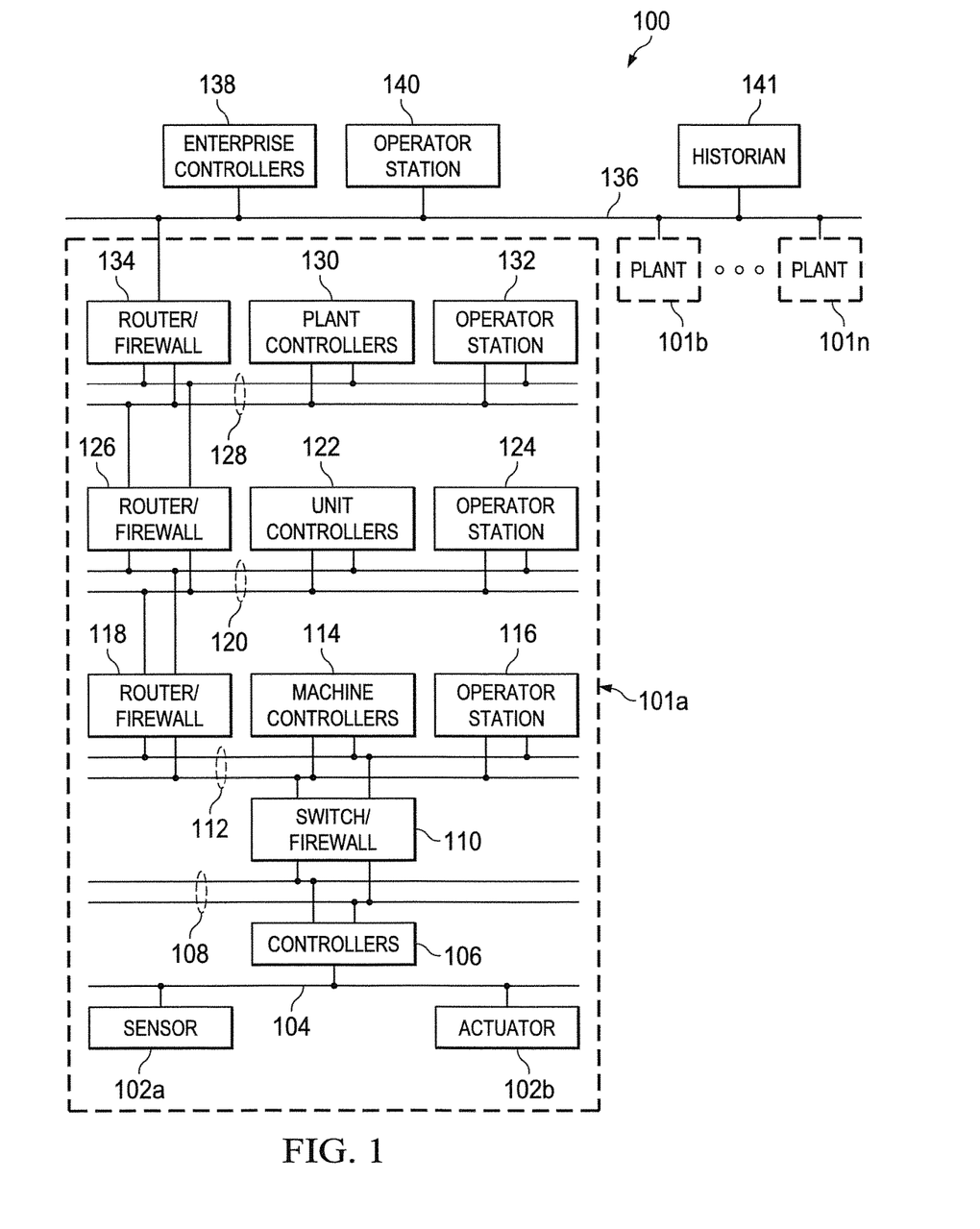
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or more multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

As described in more detail below, various components in the system 100 could be designed or modified to operate in conjunction with a data collection system and schedule for monitoring of the system 100. For example, one or more of the operator stations 116, 124, 132, 140 or the historian 141 could be configured to communicate with, receive asset health or performance information from, or send asset health or performance information to an information repository over one or more secure communication channels according to a collection schedule.

While some data collection systems currently exist, such systems typically take a long time to configure. In some process control systems that have a large number of assets, the corresponding data collection system may take several weeks to configure. To address these and other issues, embodiments of this disclosure provide a framework that reduces the initial configuration of a data collection system and generation of a data collection schedule from several weeks, possibly to a few minutes or even faster. These embodiments advantageously reduce costs incurred during this period, making the monitoring system available more quickly after delivery. Additional details regarding this framework are provided below.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where a data collection system can be automatically configured and scheduled. This functionality can be used in any other suitable system, and the system need not be related to industrial process control and automation.

Figure 2:
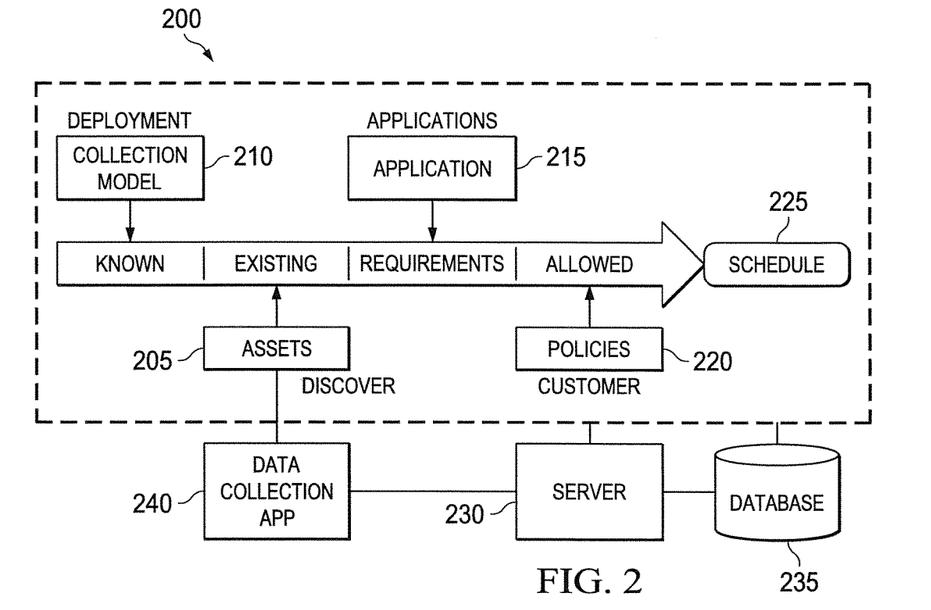
FIG. 2 illustrates an example framework for automatic configuration of a data collection system and schedule for control system monitoring according to this disclosure.

FIG. 2 illustrates an example framework 200 for automatic configuration of a data collection system and schedule for control system monitoring according to this disclosure. The framework 200 could, for example, be used for configuring a system that monitors components in the system 100 of FIG. 1. However, the framework 200 could be used with any other suitable system.

As shown in FIG. 2, the framework 200 includes a number of input components, including assets 205, a collection model 210, applications 215, and policies 220. Using these components 205-220 as input sources, the framework 200 can be used to generate a schedule 225 for collection of data for monitoring the assets of a control system. In some embodiments, a computing device 230, such as a server, can use the framework 200 to generate the schedule 225.

The assets 205 represent one or more assets for which health and performance data can be collected. The assets 205 may be referred to as residing in a "collection environment." Typically, the assets 205 in the collection environment correspond to various assets that make up all or a portion of a process control system or another type of system. For example, some or all of the assets 205 may represent, or be represented by, various components of the system 100 in FIG. 1, such as any of the sensors 102a, actuators 102b, controllers 106, 114, 122, 130, 138, or operator stations 116, 124, 132, 140. In some cases, the assets 205 correspond to assets that exist or are installed at one or more plant sites.

The assets 205 can be discovered and recorded using one or more asset discovery operations or applications. In some embodiments, different types of assets 205 can be discovered using different asset discovery applications. For example, in some systems that include a MICROSOFT WINDOWS domain network, certain types of assets 205 can be discovered by scanning for members of the MICROSOFT ACTIVE DIRECTORY service or the network neighborhood. In process control systems, some assets, such as EXPERION servers by HONEYWELL INTERNATIONAL INC., can provide details of additional sub-assets, such as EXPERION controllers and EXPERION-related network devices. After the assets 205 are discovered, an operator (such as an engineer associated with system installation or system performance) can select which of the assets 205 are to be monitored.

The collection model 210 represents a data model defining asset attributes that are known how to collect. These asset attributes can be referred to as "collection parameters."

The collection parameters can be arranged and categorized according to asset type in the model 210. For example, if an asset 205 is a MICROSOFT WINDOWS-based computer, there are hundreds of known performance indicators, such as central processing unit (CPU) utilization, memory utilization, and disk read time, that can be read and hundreds of registry entries that can be accessed. Such collection parameters for the collection model 210 may be obtained from asset specifications such as WINDOWS MANAGEMENT INSTRUMENTATION (WMI) for MICROSOFT WINDOWS. As another example, if an asset 205 is an EXPERION server, there are various known types of collection parameters that can be determined. Together, the collection parameters for each type of asset 205 make up the collection model 210.

The collection model 210 also includes the "how to" details for data collection. For example, the collection model 210 can identify data sources (such as WINDOWS PERFORMANCE MONITOR by MICROSOFT, WMI, etc.) from which collection parameters can be obtained. The collection model 210 can also provide configuration details associated with data source interfaces. The collection model 210 further associates the assets 205 with collection parameter metadata, such as parameter description, unit of measure, or security classifications. In addition, the collection model 210 can include a default collection rate for each asset type or collection parameter, such as by specifying that CPU utilization will be collected every two seconds. Further details of the collection model 210 are described below with respect to FIG. 3.

The applications 215 represent one or more executable software or firmware applications that use health or performance data "streamed" (transmitted or otherwise sent) to the applications 215 on a regular or other basis. In many cases, the applications 215 are utility applications associated with a monitoring and reporting system or asset health in order to ensure optimal performance of a system. As a particular example, one application 215 can be the WINDOWS PERFORMANCE MONITOR by MICROSOFT. Other applications 215 may include customized applications specifically developed for a particular company, enterprise, customer, plant, control system, asset, or asset group. In some cases, an application 215 can include a financial component that measures financial impacts based on performance and health of company or system assets. In general, the applications 215 can include any suitable application that uses health or performance data of assets during operation.

The applications 215 may also be associated with information regarding the data or parameters of the assets 205 to be collected and used. For example, a particular application 215 can have a requirement that states "For WINDOWS-based computers, CPU utilization and memory utilization are required." In some embodiments, there can also be a temporal element to the application requirements, such as when "Average CPU utilization of each WINDOWS-based computer is required every hour." Of course, each application 215 may not initially know what assets 205 are actually part of the collection environment. However, the framework 200 can be used as described in greater detail below to cross-reference the applications 215 with the list of assets 205 and the collection model 210 to create an actionable collection plan. Further details of the applications 215 are described below with respect to FIG. 4.

The policies 220 represent one or more policies or rules that govern, drive, or restrict the collection, distribution, and usage of data. For example, some applications 215 may execute on a cloud-based computer or server. For security reasons, there can be a policy 220 that certain types of performance or health information and data will not be sent to an application 215 that operates in a cloud environment. The policies 220 can be predefined, customized, or developed from scratch on-site. That is, depending on system requirements, an enterprise or plant can use one or more predefined policies 220 without modification, customize one or more predefined policies 220 for particular system requirement(s), develop one or more policies 220 from scratch, or any combination of these. The policies 220 are optional, meaning some enterprises may have no policies 220 that affect the generation of the schedule 225.

The schedule 225 represents a collection schedule indicating the health or performance data that is collected from various assets 205, when and how often the data is collected, and to which applications 215 the health or performance data is provided. The schedule 225 is generated according to the framework 200 by cross-referencing the information of the assets 205 and the collection model 210 with the applications 215 and, optionally, the policies 220.

In some embodiments, the framework 200 generally operates in two stages within a target control system, such as the system 100. The first stage includes initial installation and periodically following of any changes in the assets (such as a plant equipment change). During the first stage, an asset discovery operation is performed to discover the assets 205. This may include execution of an asset discovery utility on the computing device 230 or other computing device(s) connected to a network. The asset discovery utility searches out computers, controllers, network switches, and any other assets 205, determines the functionality of each asset 205, and records the assets 205 in a database 235.

During the second stage, the collection model 210 is cross-referenced with each asset 205 based on the functions discovered for that asset 205. This identifies what data or information could be collected from the assets 205. That is, using the information about the assets 205 and the collection model 210, the framework 200 can identify the data points that could be collected from the assets 205. The information that could be collected is then cross-referenced with the requirements of the applications 215 that use such data or information and, optionally, the policies 220 that govern data usage to identify what data or information should actually be collected.

In particular embodiments, a process for using the framework 200 is as follows. First, the computing device 230 is installed at a site that is accessible to a plant operator. The computing device 230 represents any suitable computing device capable of processing data and communicating with other computing devices over one or more networks. The computing device 230 can represent, or be represented by, one or more of the operator stations 116, 124, 132, 140 or the historian 141 of FIG. 1. In some cases, the computing device 230 may be installed in a cloud environment and may be accessed by the plant operator over a local area network (LAN), wide area network (WAN), virtual private network (VPN), or other network connection. The collection model 210 can then be installed for use by the computing device 230. This can include storing the collection model in the database 235. In some embodiments, the database 235 may represent a relational database or other data storage space disposed in a memory of the computing device 230 or in another device communicatively coupled to the computing device 230, such as via a bus or a network connection.

Later, assets 205 may be discovered and entered into the database 235 via one or more asset discovery processes. This may include using ACTIVE DIRECTORY for MICROSOFT WINDOWS or querying an EXPERION server to determine what controllers are connected to the EXPERION server. Together, the assets 205 and the collection model 210 provide collectable information of the plant or system. At some point, one or more applications 215 are installed to be in communication with the plant or system. Each application 215 may require or use information from one or more assets 205. Information from each application 215 may also be stored in the database 235.

If an asset 205 is indicated as an asset from which information may be needed, a data collection application 240 (also referred to as an "app") can be installed on the asset 205 to manage the collection of data from that asset. The app 240 communicates with the computing device 230 in order to determine (i) what information from the asset 205 should be collected by the app 240 and sent to the computing device 230 and (ii) when and how often the information is required or requested. This communication can occur in any suitable manner, such as through a web application programming interface (API) or other suitable communication protocol. The computing device 230 can respond to the app 240 with all or portions of the collection schedule 225 for collecting particular information at particular times. This can be done automatically. In some embodiments, while the computing device 230 determines the schedule 225, the schedule 225 may not be stored at the computing device 230. Instead, the schedule 225 can be stored at the assets 205. In other embodiments, the schedule 225 could be maintained at the computing device 230.

According to the schedule 225, the app 240 collects the information (such as "percent free space" data from a computer asset identified as "SVV1") and transmits the information to the computing device 230 for storage in the database 235. The information is then available at the computing device 230 for retrieval by, or transmission to, one or more applications 215. In some embodiments, the information may only be collected if an application 215 has requested the information, and the application 215 could immediately start receiving the collected information without any additional configuration. The information can be used in any suitable manner, such as to detect problems with an asset like values going outside of a tolerance range, performance issues, values not set according to a specification or standard, policy violations, and the like.

The collection schedule 225 can be regenerated or revised at any suitable time. For example, the schedule 225 could be regenerated whenever any of the collection model 210, the assets 205, the applications 215, or the policies 220 change. Any of these events could be detected automatically or based on user input.

Although FIG. 2 illustrates one example of a framework 200 for automatic configuration of a data collection system and schedule for control system monitoring, various changes may be made to FIG. 2. For example, components could be added, omitted, combined, further subdivided, or placed in any other suitable configuration according to particular needs. Also, system frameworks can come in a variety of configurations, and FIG. 2 does not limit this disclosure to any particular configuration of framework.

Figure 3:
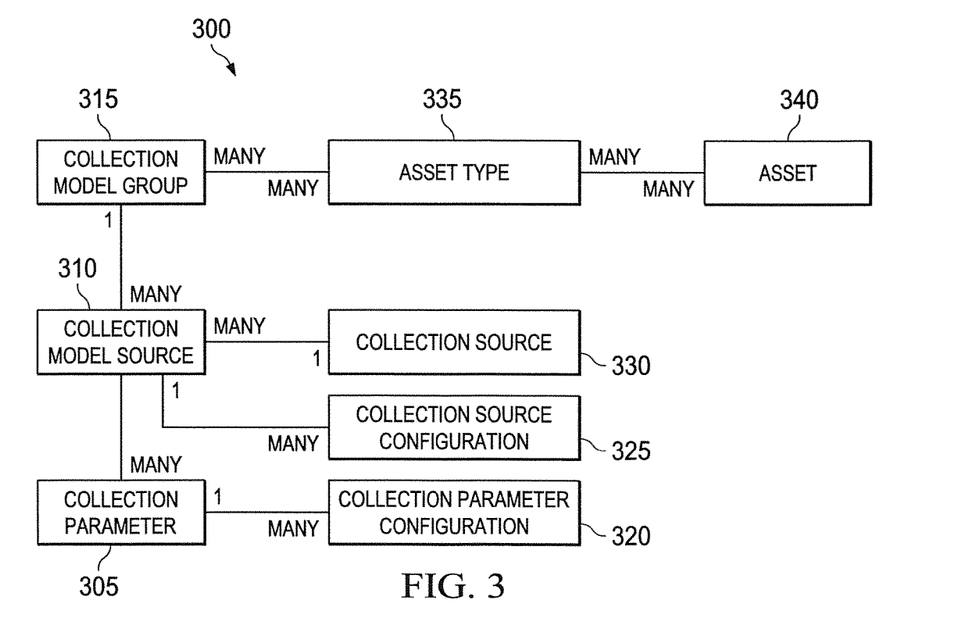
FIG. 3 illustrates an example data model associated with a collection model according to this disclosure.

FIG. 3 illustrates an example data model 300 associated with the collection model 210 according to this disclosure. The data model 300 may represent, or be represented by, portions of the database 235 of FIG. 2.

As shown in FIG. 3, the data model 300 includes collection parameters 305, collection model sources 310, collection model groups 315, collection parameter configurations 320, collection source configurations 325, collection sources 330, asset types 335, and assets 340. The connecting lines in FIG. 3 illustrate the relationships between the various data entities 305-340 of the data model 300. In particular, the vertical lines in FIG. 3 represent parent-child relationships, such as those associated with a Vector Markup Language (VML) diagram. The horizontal and diagonal lines in FIG. 3 represent associations between data entities that are not parent-child relationships.

A collection parameter 305 represents the most basic information of the collection model 210. Each collection parameter 305 is a piece of information about an asset 205 that can be collected and used in the framework 200. For example, "Available Bytes" may be one collection parameter 305 that could be collected by the WINDOWS PERFORMANCE MONITOR utility and used by one or more applications 215. Other examples of collection parameters 305 can include disk capacity, CPU utilization, memory free space, and the like. The collection parameters 305 are children of the collection model sources 310, meaning different collection parameters 305 are applicable to different collection model sources 310.

Each collection model source 310 represents a grouping of collection parameters 305 from a single category within a collection source 330. One example of a collection model source 310 is "PerformanceCounter.Memory," and collection parameters 305 associated with that collection model source 310 are related to the PerformanceCounter class in MICROSOFT WINDOWS. Multiple collection model sources 310 are children of, and are grouped together to form, a collection model group 315.

Each collection model group 315 represents a grouping of collection elements that lend themselves to be logically or functionally collected as a group. Examples of collection model groups 315 may include memory usage, CPU usage, controller parameters, and network switch parameters. The collection model 210 can be composed of one or more collection model groups 315.

The collection parameter configurations 320 represent configuration and informational details of the collection parameters 305. That is, the collection parameter configurations 320 help to define the type of information for each collection parameter 305. Examples of collection parameter configurations 320 can include units of measure (such as percent, bytes, etc.), maximum values, minimum values, data classification (such as financial, performance, inventory, or security data), and security level (such as private data, public data, or data that can be collected but not sent to a cloud computing device).

The collection source configurations 325 represent configuration and information details of one or more collection model sources 310. That is, the collection source configurations 325 help to define the types of information for a collection model source 310. One example collection source configuration 325 is a WMI parameter called "Condition." The collection source configuration 325 is an optional level of granularity, and some collection model sources 310 may not have any elements associated with a collection source configuration 325.

Each collection source 330 represents the source of data for the corresponding collection model source 310, which may be a more generalized description of the collection model source 310. One example collection source 330 is the PerformanceCounter class in MICROSOFT WINDOWS.

The asset types 335 and assets 340 represent the assets and types of assets applicable to a collection model group 315. Each asset 340 is associated with one or more asset types 335. The assets 340 can represent, or are otherwise related to, the assets 205. The asset types 335 may be determined by querying known details of a target system, such as checking for known registry entries in a MICROSOFT WINDOWS computer. Examples of asset types 335 can include computers, control systems, and process control equipment. Depending on the implementation, an asset 340 can have more than one asset type 335. For example, a computer asset 340 can be associated with a MICROSOFT WINDOWS asset type 335 and an IIS Host asset type 335.

Although FIG. 3 illustrates one example of a data model 300 associated with the collection model 210, various changes may be made to FIG. 3. For example, while the data entities 305-340 have been described in one configuration and with various examples, such a description is not limiting. The data entities within the data model 300 are designed to be generic and flexible so that an enterprise can use the data entities in a manner that best fits the needs of the enterprise. Other embodiments could include other or additional data entities, or the data entities could include other or additional types of information. Also, the data model 300 could include any suitable number of each data entity.

Figure 4:
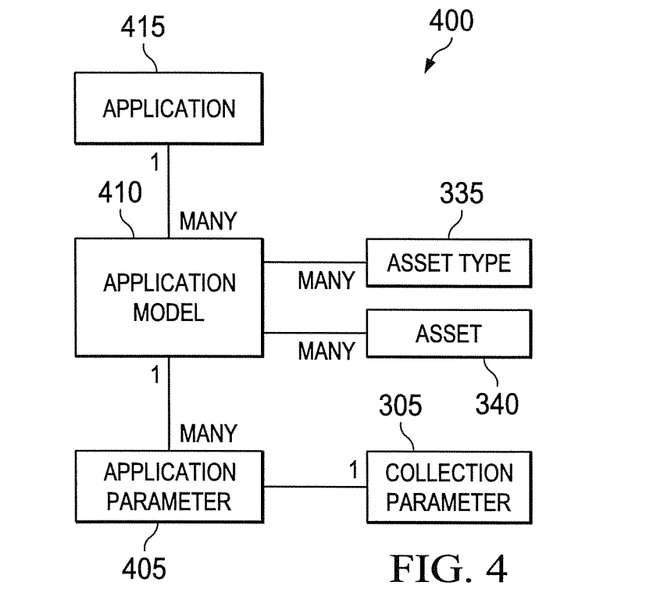
FIG. 4 illustrates an example data model associated with an application according to this disclosure.

FIG. 4 illustrates an example data model 400 associated with an application 215 according to this disclosure. The data model 400 may represent, or be represented by, portions of the database 235 of FIG. 2.

As shown in FIG. 4, the data model 400 includes application parameters 405, application models 410, and applications 415. The data model 400 also includes various collection parameters 305, asset types 335, and assets 340 from the data model 300 of FIG. 3. As in FIG. 3, the connecting lines in FIG. 4 illustrate the relationships between the various data entities 305, 335, 340, 405-415 of the data model 400.

The application parameter 405 represents the most basic information of the data model 400. Each application parameter 405 is a piece of information about an asset 205 that is required or used by an application 215 and is therefore to be collected according to the collection schedule 225. One example of an application parameter 405 is Performance.Memory.AvailableBytes, which is associated with the WINDOWS PERFORMANCE MONITOR utility. Each application parameter 405 is related to a corresponding collection parameter 305 as indicated by the connecting line in FIG. 4. For instance, an application parameter 405 may identify the collection parameter 305 to be collected for an application 215.

The application model 410 represents a grouping of application parameters 405. In some embodiments, the application model 410 groups the application parameters 405 according to particular asset types 335 or assets 340, such as computers, controllers, network switches, and the like. The application model 410 can also target specific asset types 335. For example, if not specified, the application model 410 may apply to all asset types 335 appropriate to each parameter (such as MICROSOFT WINDOWS). Multiple application models 410 may be children of, and are grouped together to form, one application 415. At an installation site, the application model 410 can be adjusted to identify specific assets 340, possibly indicating a different set of application parameters 405 for that set of assets 340.

Each application 415 is an instance of an application 215. An application 415 therefore represents an application that uses or requires data collected according to the collection schedule 225. Some applications 415 can include preexisting performance monitoring applications, such as the WINDOWS PERFORMANCE MONITOR utility. Other applications 415 can include one or more internally-developed or other applications, such as a customized system performance application, that require or use data, information, or parameters collected from different sources.

Although FIG. 4 illustrates one example of a data model 400 associated with an application 215, various changes may be made to FIG. 4. For example, while the data entities 305, 335, 340, 405-415 have been described in one configuration and with various examples, such a description is not limiting. These data entities within the data model 400 are designed to be generic and flexible so that an enterprise can use the data entities in a manner that best fits the needs of the enterprise. Other embodiments could include other data entities or the data entities could include other types of information. Also, the data model 400 could include any suitable number of each data entity.

Figure 5:
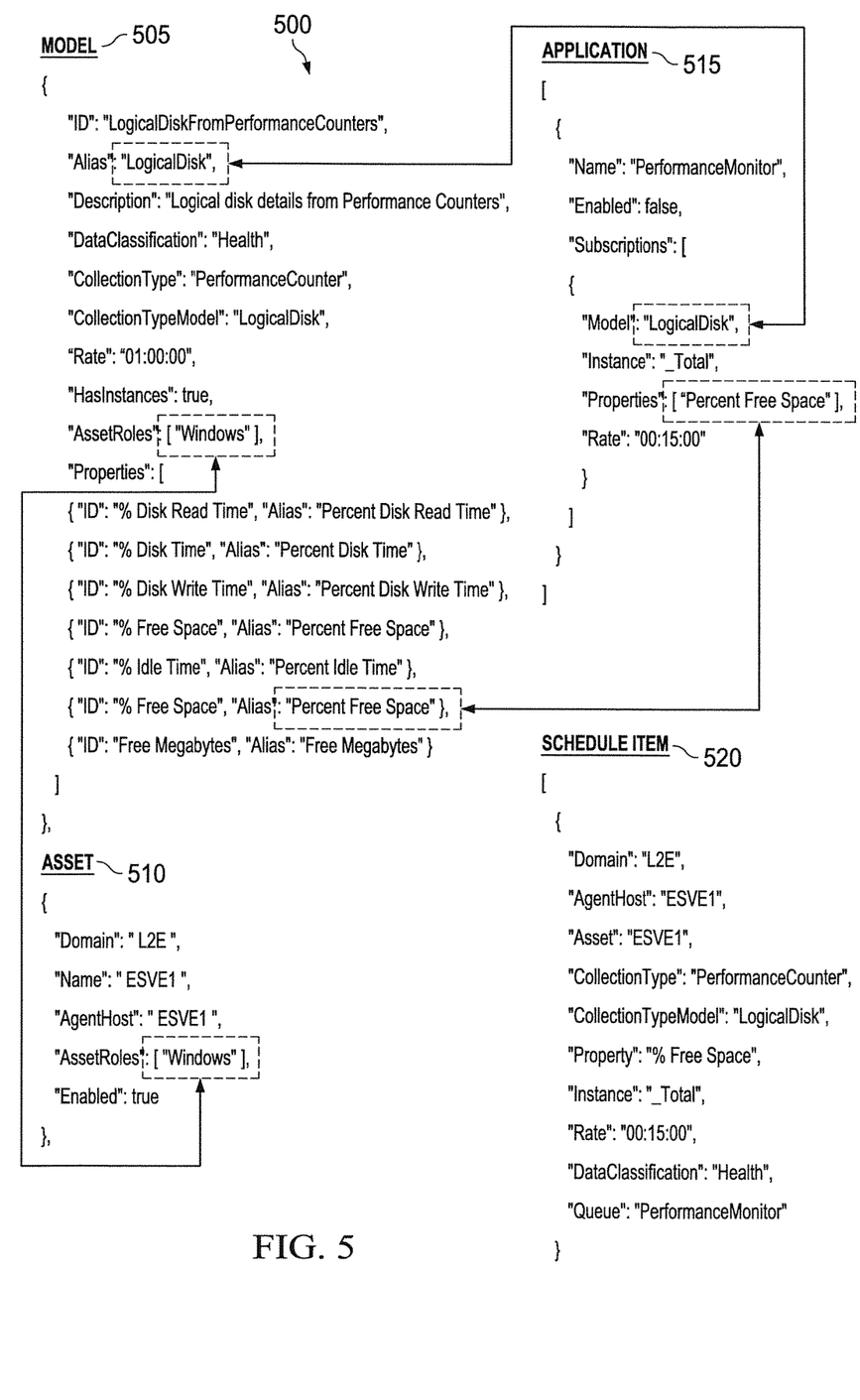
FIG. 5 illustrates portions of an example database supporting a data collection system and schedule for control system monitoring according to this disclosure.

FIG. 5 illustrates portions of an example database 500 supporting a data collection system and schedule for control system monitoring according to this disclosure. The database 500 can be used in conjunction with the framework 200 of FIG. 2. In particular, the database 500 can represent, or be represented by, the database 235. However, the database 500 can be used with any other suitable system.

As shown in FIG. 5, data records 505-520 from different data tables of the database 500 are interrelated based on data that is common between the records. For example, a data record 505 from a collection model table includes a "Windows" value, as does a data record 510 from an asset table. Similarly, the data record 505 includes a "Logical Disk" value, as does a data record 515 from an application table. The data tables may represent, or be represented by, various data entities 305-340, 405-415 of FIGS. 3 and 4. The interrelationships of the data records 505-520 in the database 500 allow the data to be cross-referenced in order to define a collection schedule as described here. Such a collection schedule can be generated and stored in one or more data tables or data records, such as the schedule item record 520.

Although FIG. 5 illustrates one example of a database 500 supporting a data collection system and schedule for control system monitoring, various changes may be made to FIG. 5. For example, data tables and records could be added, omitted, combined, further subdivided, or placed in any other suitable configuration according to particular needs. Also, databases can come in a wide variety of configurations, and FIG. 5 does not limit this disclosure to any particular configuration of database.

Figure 6:
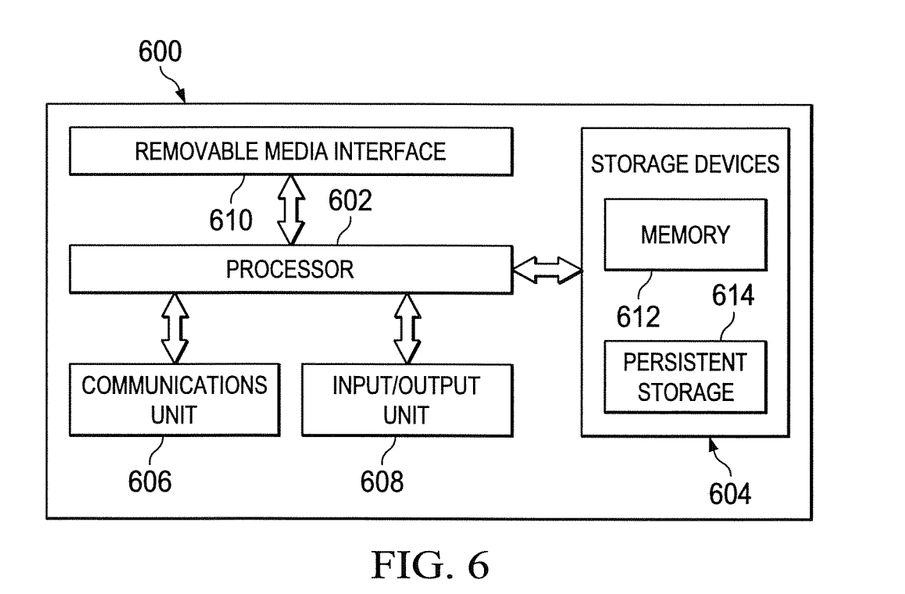
FIG. 6 illustrates an example device supporting automatic configuration of a data collection system and schedule for control system monitoring according to this disclosure.

FIG. 6 illustrates an example device 600 supporting automatic configuration of a data collection system and schedule for control system monitoring according to this disclosure. The device 600 could, for example, represent the computing device 230 of FIG. 2 or one of the operator stations 116, 124, 132, 140 of FIG. 1. However, the computing device 230 and the operator stations 116, 124, 132, 140 could be implemented using any other suitable device or system, and the device 600 could be used in any other suitable system.

As shown in FIG. 6, the device 600 includes at least one processor 602, at least one storage device 604, at least one communications unit 606, at least one input/output (I/O) unit 608, and at least one removable media interface 610. Each processor 602 can execute instructions, such as those that may be loaded into a memory 612. Each processor 602 denotes any suitable processing device, such as one or more microprocessors, microcontrollers, digital signal processors, application specific integrated circuits (ASICs), field programmable gate arrays (FPGAs), or discrete circuitry.

The memory 612 and a persistent storage 614 are examples of storage devices 604, which represent any structure(s) capable of storing and facilitating retrieval of information (such as data, program code, and/or other suitable information on a temporary or permanent basis). The memory 612 may represent a random access memory or any other suitable volatile or non-volatile storage device(s). The persistent storage 614 may contain one or more components or devices supporting longer-term storage of data, such as a read only memory, hard drive, Flash memory, or optical disc. In accordance with this disclosure, the memory 612 and persistent storage 614 may be configured to store information and data associated with automatic configuration of a data collection system and schedule for control system monitoring, such as the framework 200 of FIG. 2 or the database 500 of FIG. 5.

The communications unit 606 supports communications with other systems or devices. For example, the communications unit 606 could include a network interface card or a wireless transceiver facilitating communications over a wired or wireless network (such as any of the networks 104, 108, 112, 120, 128, 136). The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display, printer, or other suitable output device.

Each removable media interface 610 denotes a structure to which a storage device can be coupled. For example, the device 600 could include one or more USB slots, Secure Digital High Capacity (SDHC) or other Flash memory slots, or other interfaces for coupling to storage devices. Depending on the implementation, the device 600 could include a single removable media interface 610 or multiple removable media interfaces 610 of the same type or of different types.

Although FIG. 6 illustrates one example of a device 600 supporting automatic configuration of a data collection system and schedule for control system monitoring, various changes may be made to FIG. 6. For example, various components in FIG. 6 could be combined, further subdivided, or omitted and additional components could be added according to particular needs. Also, computing devices can come in a wide variety of configurations, and FIG. 6 does not limit this disclosure to any particular configuration of computing device.

Figure 7:
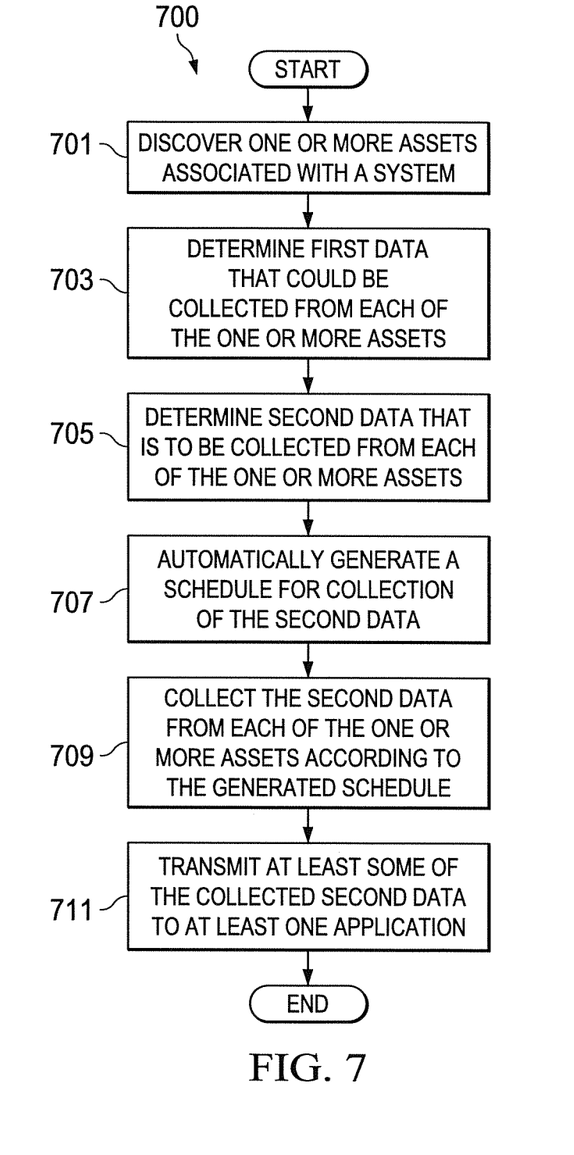
FIG. 7 illustrates an example method for automatic configuration of a data collection system and schedule for control system monitoring according to this disclosure.

FIG. 7 illustrates an example method 700 for automatic configuration of a data collection system and schedule for control system monitoring according to this disclosure. For ease of explanation, the method 700 is described as being performed using the computing device 230 of FIG. 2. However, the method 700 could be used with any suitable device or system.

At step 701, the computing device discovers one or more assets associated with a system. This may include, for example, the computing device 230 discovering one or more assets of the system 100. The assets can be discovered following an initial installation of the assets or following a change in the assets.

At step 703, the computing device determines first data that could be collected from each of the one or more assets by cross-referencing the one or more assets with a collection model. This may include, for example, the computing device 230 determining the first data by cross-referencing assets 205 with the collection model 210.

At step 705, the computing device determines second data that is to be collected from each of the one or more assets by cross-referencing the first data with requirements of one or more applications that use data from the one or more assets. This may include, for example, the computing device 230 determining the second data by cross-referencing the first data with requirements of one or more applications 215. In some embodiments, the computing device 230 can also cross-reference the first data with one or more policies 220 that govern collection and usage of data.

At step 707, the computing device automatically generates a schedule for collection of the second data that is to be collected from each of the one or more assets. This may include, for example, the computing device 230 generating the schedule 225 for collection of data from one or more of the assets 205.

At step 709, the computing device collects the second data from each of the one or more assets according to the generated schedule. Collecting the second data from each of the one or more assets can include executing a data collection application installed on each asset to collect the second data and receiving the second data from each data collection application. This may include, for example, an app 240 executing on one or more assets 205 and the computing device 230 collecting the data from the app(s) 240.

At step 711, the computing device transmits at least some of the collected second data to at least one of the one or more applications. This may include, for example, the computing device 230 transmitting data to one or more of the applications 215.

Although FIG. 7 illustrates one example of a method 700 for automatic configuration of a data collection system and schedule for control system monitoring, various changes may be made to FIG. 7. For example, while shown as a series of steps, various steps shown in FIG. 7 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for the automatic configuration of a data collection system and schedule monitoring for an industrial process control and automation system comprising:
   discovering one or more assets associated with the industrial process control and automation system, wherein the assets include at least one of sensors, actuators, controllers or operator stations;
   determining first data that could be collected from each of the one or more assets by cross-referencing the one or more assets with a collection model, the collection model providing collection parameters that are arranged and categorized according to an asset type used in the collection model;
   determining second data that is to be collected from each of the one or more assets by cross-referencing the first data with requirements of one or more applications that use data from the one or more assets; and
   automatically generating a schedule for collection of the second data from the one or more assets.

2. The method of claim 1, further comprising:
   collecting the second data from each of the one or more assets according to the generated schedule; and
   transmitting at least some of the collected second data to at least one of the one or more applications.

3. The method of claim 2, wherein collecting the second data comprises:
   executing a data collection application installed on each of the one or more assets to collect the second data; and
   receiving the second data from each data collection application.

4. The method of claim 1, wherein determining the second data that is to be collected from each of the one or more assets further comprises:
cross-referencing the first data with one or more policies that govern collection and usage of data.

5. The method of claim 1, wherein discovering the one or more assets comprises discovering the one or more assets following an initial installation of the one or more assets or following a change in the one or more assets.

6. The method of claim 1, further comprising:
storing the second data in a relational database.

7. The method of claim 1, wherein each asset comprises a computer, a controller, or a network switch.

8. An apparatus for the automatic configuration of a data collection system and schedule monitoring for an industrial process control and automation system comprising:
at least one processing device configured to:
discover one or more assets associated with the industrial process control and automation system, wherein the assets include at least one of sensors, actuators, controllers or operator stations;
determine first data that could be collected from each of the one or more assets by cross-referencing the one or more assets with a collection model, the collection model providing collection parameters that are arranged and categorized according to an asset type used in the collection model;
determine second data that is to be collected from each of the one or more assets by cross-referencing the first data with requirements of one or more applications that use data from the one or more assets; and
automatically generate a schedule for collection of the second data from the one or more assets.

9. The apparatus of claim 8, wherein the at least one processing device is further configured to:
collect the second data from each of the one or more assets according to the generated schedule; and
transmit at least some of the collected second data to at least one of the one or more applications.

10. The apparatus of claim 9, wherein, to collect the second data, the at least one processing device is configured to:
communicate with a data collection application installed on each of the one or more assets to collect the second data; and
receive the second data from each data collection application.

11. The apparatus of claim 8, wherein, to determine the second data that is to be collected from each of the one or more assets, the at least one processing device is configured to:
cross-reference the first data with one or more policies that govern collection and usage of data.

12. The apparatus of claim 8, wherein the at least one processing device is configured to discover the one or more assets following an initial installation of the one or more assets or following a change in the one or more assets.

13. The apparatus of claim 8, wherein the at least one processing device is further configured to store the second data in a relational database.

14. A non-transitory computer readable medium containing instructions that, when executed by at least one processing device for the automatic configuration of a data collection system and schedule monitoring for an industrial process control and automation system, cause the at least one processing device to:
discover one or more assets associated with the industrial process control and automation system, wherein the assets include at least one of sensors, actuators, controllers or operator stations;
determine first data that could be collected from each of the one or more assets by cross-referencing the one or more assets with a collection model, the collection model providing collection parameters that are arranged and categorized according to an asset type used in the collection model;
determine second data that is to be collected from each of the one or more assets by cross-referencing the first data with requirements of one or more applications that use data from the one or more assets; and
automatically generate a schedule for collection of the second data from the one or more assets.

15. The non-transitory computer readable medium of claim 14, further containing instructions that, when executed by the at least one processing device, cause the at least one processing device to:
collect the second data from each of the one or more assets according to the generated schedule; and
transmit at least some of the collected second data to at least one of the one or more applications.

16. The non-transitory computer readable medium of claim 15, wherein the instructions that when executed cause the at least one processing device to collect the second data comprise:
instructions that when executed cause the at least one processing device to:
communicate with a data collection application installed on each of the one or more assets to collect the second data; and
receive the second data from each data collection application.

17. The non-transitory computer readable medium of claim 14, wherein the instructions that when executed cause the at least one processing device to determine the second data that is to be collected comprise:
instructions that when executed cause the at least one processing device to cross-reference the first data with one or more policies that govern collection and usage of data.

18. The non-transitory computer readable medium of claim 14, wherein the instructions when executed cause the at least one processing device to discover the one or more assets following an initial installation of the one or more assets or following a change in the one or more assets.

19. The non-transitory computer readable medium of claim 14, further containing instructions that, when executed by the at least one processing device, cause the at least one processing device to:
store the second data in a relational database.

* * * * *